United States Patent
Kaniut

[11] Patent Number: 5,156,122
[45] Date of Patent: Oct. 20, 1992

[54] SELF-SYNCHRONIZING 720 DEGREE CLUTCH FOR PARTIAL CRANKSHAFTS OF SPLIT ENVIRONMENTAL ENGINES

[76] Inventor: Herbert M. Kaniut, Orrerweg 33/35, 5000 Cologne 71, Fed. Rep. of Germany

[21] Appl. No.: 792,387

[22] Filed: Nov. 15, 1991

Related U.S. Application Data

[63] Continuation-in-part of Ser. No. 527,825, May 24, 1990, Pat. No. 5,092,293.

[30] Foreign Application Priority Data

Nov. 16, 1990 [DE] Fed. Rep. of Germany ....... 4036492

[51] Int. Cl.$^5$ .............................................. F02B 75/18
[52] U.S. Cl. ................................ 123/198 F; 192/53 H
[58] Field of Search .......... 123/197.5, 198 F, DIG. 8; 192/53 H, 67 A

[56] References Cited

U.S. PATENT DOCUMENTS

| | | | |
|---|---|---|---|
| 3,197,001 | 7/1965 | Clements | 192/53 H |
| 4,389,985 | 6/1983 | Huber et al. | 123/198 F |
| 4,555,003 | 11/1985 | Phillips | 123/198 F |

Primary Examiner—Noah P. Kamen
Attorney, Agent, or Firm—White & Case

[57] ABSTRACT

A self-synchronizing 720°-clutch is disclosed which is installed between the partial crankshafts of Split Environmental Engines. These engines have the capacity effectively to reduce the total amount of exhaust gases, and extensively to reduce $CO_2$-emissions of motor vehicles. The presented clutch synchronizes and clutches together the partial crankshafts at intervals of two complete relative revolutions of the partial crankshafts, or at intervals of a multiple thereof and is suitable for all four-cycle engines.

6 Claims, 4 Drawing Sheets

SELF-SYNCHRONIZING 720 DEGREE CLUTCH FOR PARTIAL CRANKSHAFTS OF SPLIT ENVIRONMENTAL ENGINES

CROSS-REFERENCE TO RELATED APPLICATIONS

This application is a continuation in part of copending application Ser. No. 07/527,825, dated May 24, 1990, U.S. Pat. No. 5,092,293, which is incorporated herein by reference.

BACKGROUND OF THE INVENTION

This invention relates generally to a split environmental internal combustion engine, which uses partial crankshaft operation so that the engine may operate on less than all of its cylinders under light load conditions and on all of its cylinders under full load conditions. The partial crankshaft operation is accomplished through the use of a self-synchronizing clutch. The clutch is placed between the partial crankshafts of the split engine, and selectively clutches them together. The present invention relates in particular to a self-synchronizing clutch which synchronizes and clutches together the partial crankshafts at intervals of 720°, which is two complete relative revolutions between the partial crankshafts, or at a multiple of intervals thereof. The clutch may be used in all types of four-cycle split environmental engines.

Split environmental internal combustion engines can reduce the total amount of exhaust gases and $CO_2$ emissions of motor vehicles, restrain climatic hothouse effect, reduce contamination of city air, and reduce fuel consumption.

The clutch is a further development of the self-synchronizing clutch disclosed in my copending application mentioned above. The clutch disclosed therein synchronizes and clutches together the partial crankshafts at intervals of 360°, which is one complete relative revolution between the partial crankshafts. That clutch is limited in that it can be used only for four-cycle split environmental engines which have specially designed crankshafts.

A major problem associated with other self-synchronizing clutches in the prior art is that they cannot be easily altered to change the clutching intervals from 360° to 720°. Prior art clutches use special signal transmitters which monitor the revolution differences between the partial camshafts of the partial engines and activate the crankshaft clutches to achieve the required clutching actions in a smooth manner. The system is complicated and can be problematic due to the fact that a complex scheme of transferring lines must introduce the signals into the rotating clutches.

A preferable clutch design would be simple, robust, and easily modified so that clutching intervals could be changed from 360° to 720° with no need for complicated activation systems.

Accordingly, it is an objective of the claimed invention to provide a self-synchronizing 720° clutch for installation between the partial crankshafts of split environmental engines, which synchronizes and clutches together the partial crankshafts at intervals of 720° or a multiple thereof.

Another objective of the claimed invention is to provide a clutch that is suitable for all types of four-cycle split environmental internal combustion engines.

A further objective of the claimed invention is to provide a self-synchronizing 720° clutch having a simple design, notwithstanding its comprehensive capability of synchronizing all types of partial-crankshafts of four-cycle split environmental internal combustion engines.

SUMMARY OF THE INVENTION

The foregoing and other objectives will be realized by the utilization of the self-synchronizing 360° clutch of my foregoing application Ser. No. 07/527,825 as the basic design for the self-synchronizing 720° clutch and an improvement comprising the annexation of an additional control gear, integrated into the basic clutch design, which controls the pawl movements for selective engagement at intervals of 720°.

DESCRIPTION OF THE PREFERRED EMBODIMENT

360° Clutch Design

Figure 1:
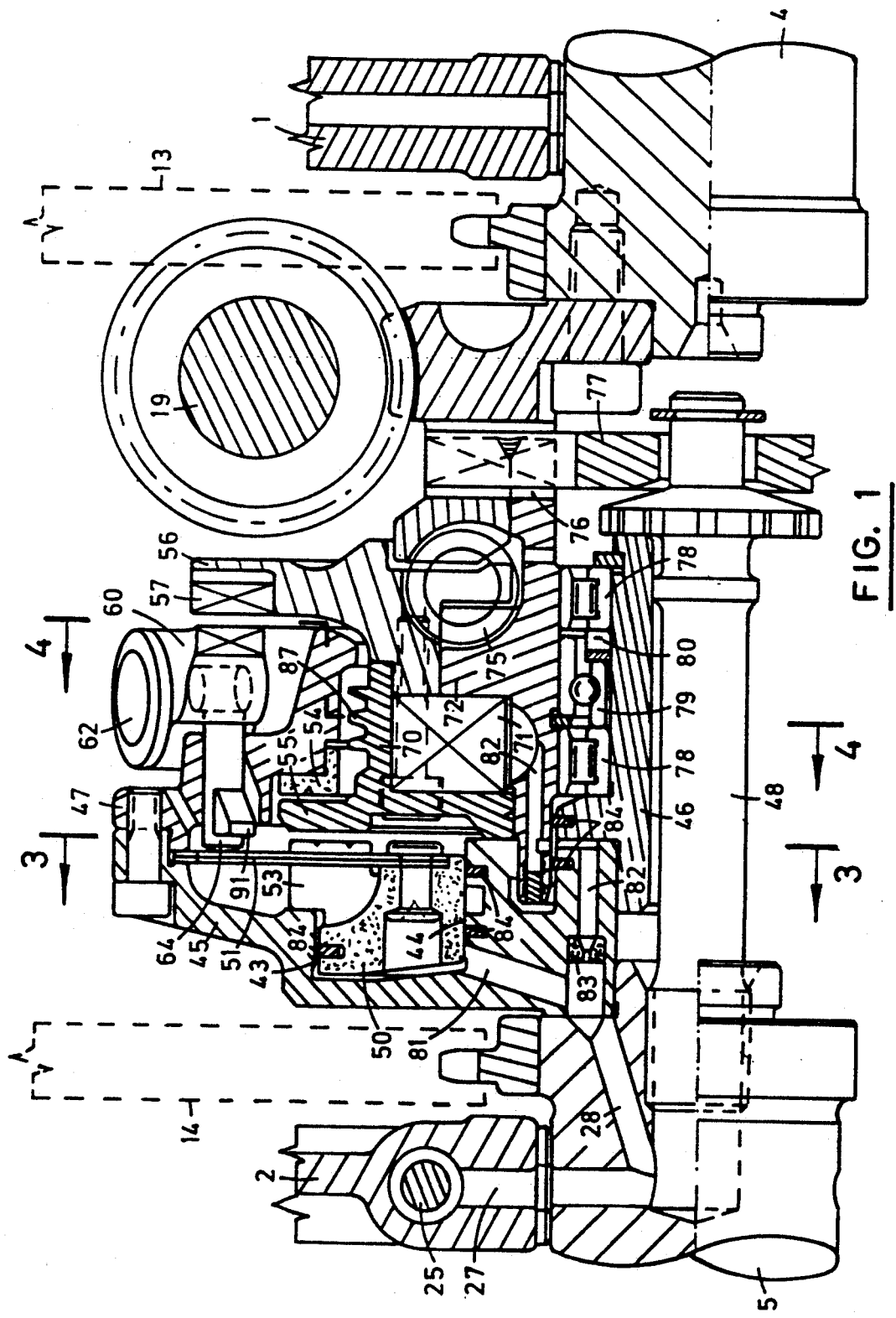
FIG. 1 is a first axial cross-sectional view of the self-synchronizing clutch.
Figure 2:
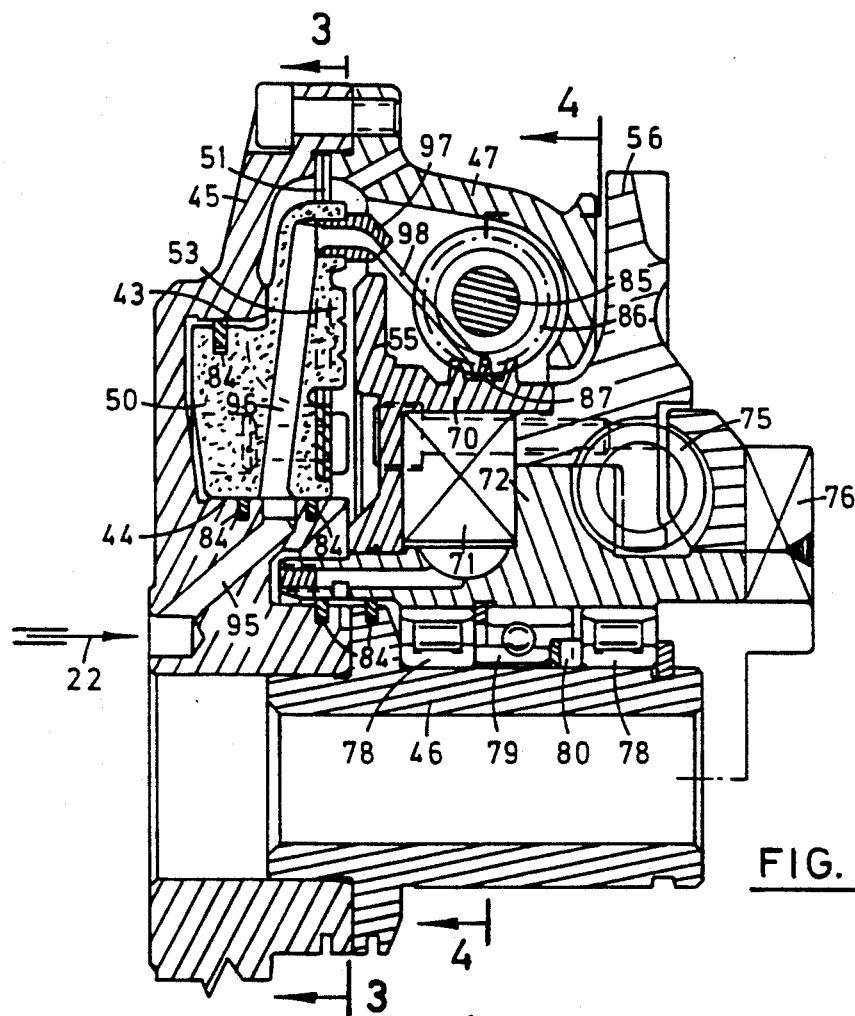
FIG. 2 is a second axial cross-sectional view of the self-synchronizing clutch.

The basic clutch design, as disclosed in the above mentioned application Ser. No. 527,825, comprises a friction clutch part and an axially latching ratchet mechanism part. The clutch parts are connected in parallel and can transfer torque between the partial crankshafts individually or simultaneously.

The friction clutch part has a reduced torque transferring capacity so that when the more powerful secondary engine engages, its partial crankshaft may slowly pulsate over the friction clutch part and thus rotate somewhat faster than the partial crankshaft of the primary engine.

The ratchet mechanism part has a characteristic grip direction opposite to the relative rotation direction between the two partial crankshafts during starting an cranking operations of the secondary engine by the primary engine and therefore can only clutch-in if the secondary engine is rotating faster than the primary engine.

The ratchet wheel of the ratchet mechanism-part is connected to the crankshaft of the primary engine and has only one pawl gap for each pawl, which results in only one clutching-in point after each complete relative revolution of the partial crankshafts. Each pawl is connected to the partial crankshaft of the secondary engine so that when the secondary engine is engaged its rotating partial crankshaft slowly pulsates over the friction clutch part until the pawl aligns with its pawl gap in the rotating ratchet wheel. At this point, the pawl latches into the pawl gap and the partial engines couple, and effectively become one engine. The clutching in point coincides with the synchronization-point between the partial crankshafts of the partial engines and therefor the total engine runs smoothly. Additionally the friction disc of the friction clutch part is rigidly connected to the ratchet wheel and together they form the housing for the hydrostatical torsional vibration damper.

720° Clutch Design

This basic 360° clutch design is improved by means of an additional inventive control-gear, which enables self-synchronizing 720° operation, where the clutch synchronizes and clutches together the partial crankshafts at intervals of two complete relative revolutions between the partial crankshafts, or at a multiple of intervals thereof.

Referring to FIGS. 1, 2, 4, and 5, the control gear is integrated into the clutch design, and it comprises a large helical gear central sun-wheel 87, small helical gear wheels 86, auxiliary shafts 85 with conical cams 88, tappets 90, and additional push-pin noses 91, which are portions of the push-pins 64. The push-pins 64 are used to selectively engage pawls 60 into pawl gaps 57, so that torque may be transferred from the partial crankshaft 5 of the secondary engine to the partial crankshaft 4 of the primary engine.

The number of gear wheels, auxiliary shafts, conical cams and the like that are employed corresponds to the number of pawls desired, and the number may vary accordingly. Two pawls are used in the preferred embodiment.

In detail, the control gear part comprises a large helical gear central sun wheel 87 attached to the outside of the housing 70 of the hydrostatical torsional vibration damper 70, 71, 72, 82, 83 and 84, and several small helical gear wheels 86 which are positioned tangentially to the sun wheel and equally spaced in the periphery of the sun wheel. The sun wheel 87 engages the small helical gear wheels 86. The step-down gear ratio between them is 1:2, which means that sun wheel 87 must revolve twice to rotate the small helical gear wheels 86 once. Additionally, the sun wheel 87 is rigidly connected to the partial crankshaft 4 of primary engine 1 through the torsional vibration damper 70, 71, 72, 82, 83 and 84 and the tangential springs 75.

The small helical gear wheels 86 are fixed to auxiliary shafts 85, which coaxially extend from the small helical gear wheels 86 in a direction tangential to the circumference of the sun wheel at the point where the sun wheel 87 meshes with the smaller gear wheels 86. The small helical gear wheels 86 are mounted in the bights of the clutch cover 47 of the clutch housing 45, while the auxiliary shafts 85 are bared in the side walls of the bights and extend out of the housing 45. The conical cams 88 fixed to the ends of the auxiliary shafts 85 are located outside of the bights and outside of the clutch housing cover 47, where they engage tappets 90. The tappets 90 are slidably mounted in bores in the protruding rim portions of the clutch housing cover 47. The longitudinal axes of tappets 90 lie on tangential planes in relation to circumference of the sun wheel, with inclination angles in relation to the radial plane of the clutch housing 45.

Figure 5:
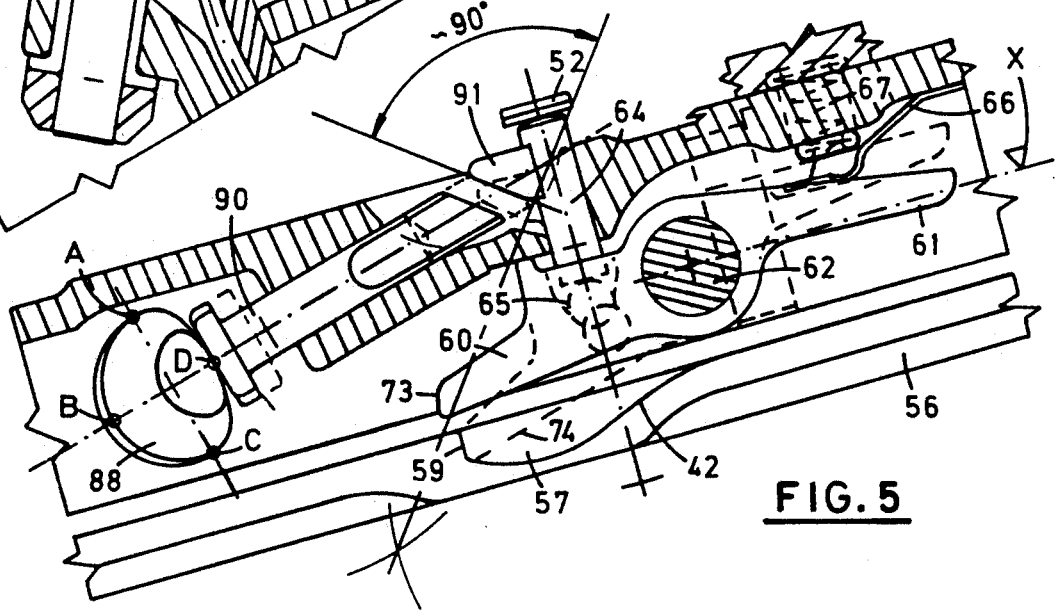
FIG. 5 is a cross-sectional view taken across line 5—5 of FIG. 4.
Figure 6:
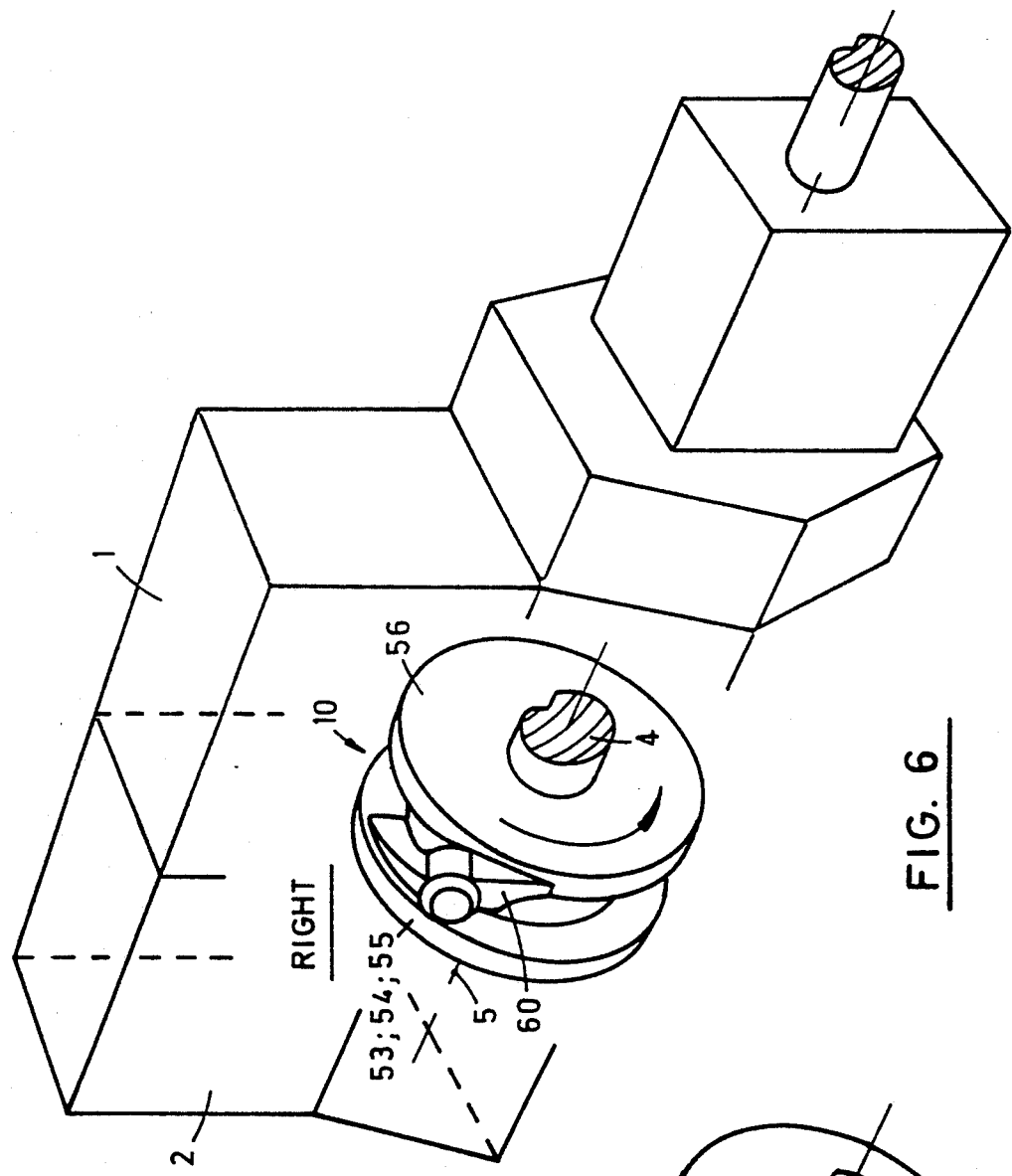
FIG. 6 and FIG. 7 are a perspective view of the outlines of the complete split environmental engine and the self-synchronizing clutch.
Figure 7:
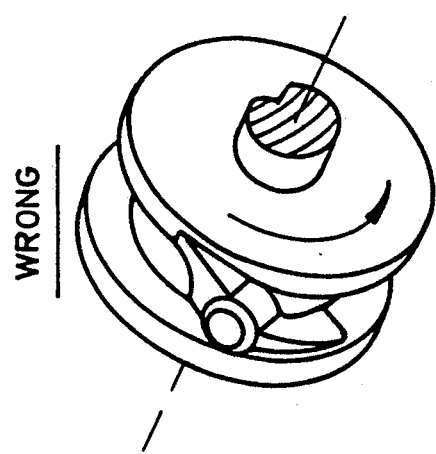

Each conical cam 88 has the shape of a half circle and a half ellipse. Referring to FIG. 5, points A, B, and C of each conical cam 88 have a constant radial distance from the rotation axis of each auxiliary shaft 85, while one point D has a smaller radial distance from said rotation axis. As each conical cam 88 rotates, the distance between each tappet 90 and the rotation axis of auxiliary shaft 85 is maximized at and between points A, B, and C and minimized at point D. Since each conical cam rotates with half the speed of the central sun wheel 87, the distance between each tappet 90 and each auxiliary shaft 85 is minimized only once during two complete revolutions of the sun wheel, which corresponds to two complete relative revolutions of the partial crankshafts 4 and 5 of the primary and secondary engines 1 and 2, respectively.

The tappets 90 engage the noses 91 of push-pins 64 which are mounted in the protruding rim section of the clutch housing cover 47 such that when the tappets are pushed off the conical cams 88, the tappets 90 hold back push-pins 64, so that the pawls 60 cannot engage the rachet-wheel 56 of the ratchet mechanism-part. However, when the smaller radial distance D meets the tappets 90, the tappets 90 release, and the push-pins 64 can turn the pawls 60 into the pawl-gaps 57 of the ratchet-wheel 56. Since this occurs only once during two complete relative revolutions of the partial crankshafts, the clutch synchronizes and clutches together the partial crankshafts at intervals of 720°.

Each tappet 90 has an inclined face on its end pointing to the nose 91 of its appertaining push-pin 64. The nose 91 of the push-pin 64 also has an inclined face and the planes of both inclined faces are parallel to each other, FIG. 5 and both inclined faces are characterized by a substantially right angled arrangement in relation to the bisectional line of the angle between the longitudinal axes of the tappet and of the pushpin. The inclined faces enable the tappet 90 to engage push-pin nose 91 when the push-pin is already moved forward by the spring-tongue 52 so that the tappet can move the push-pin 64 backwards and unlatch the pawl 60 from the pawl gap 57.

Figure 3:
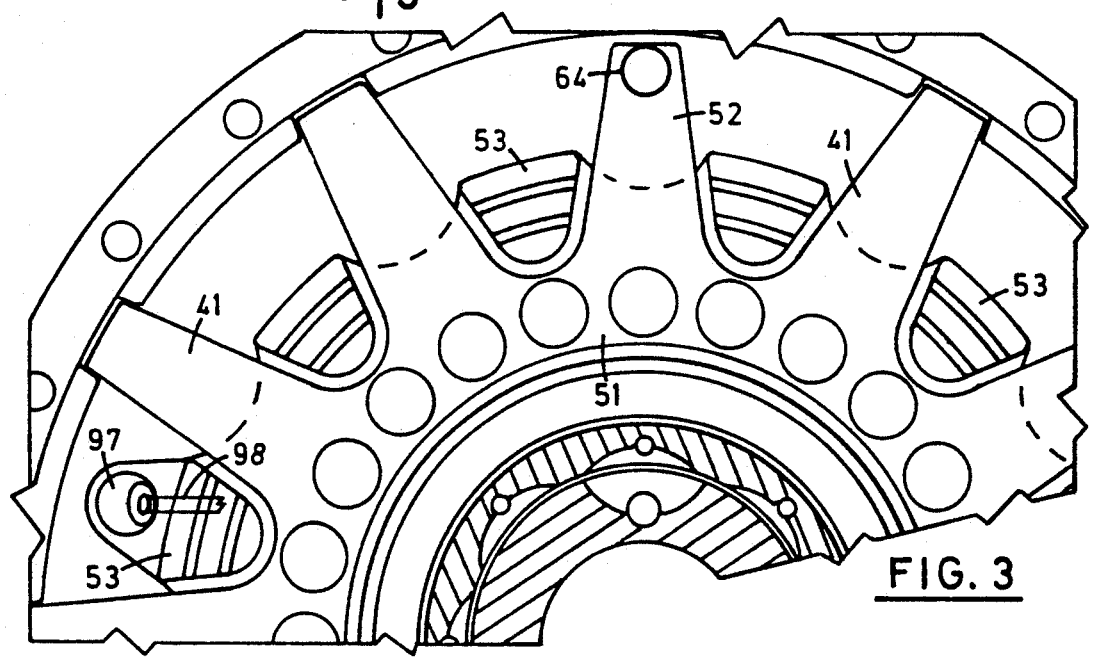
FIG. 3 is a cross-sectional view taken across line 3—3 of FIG. 1.
Figure 4:
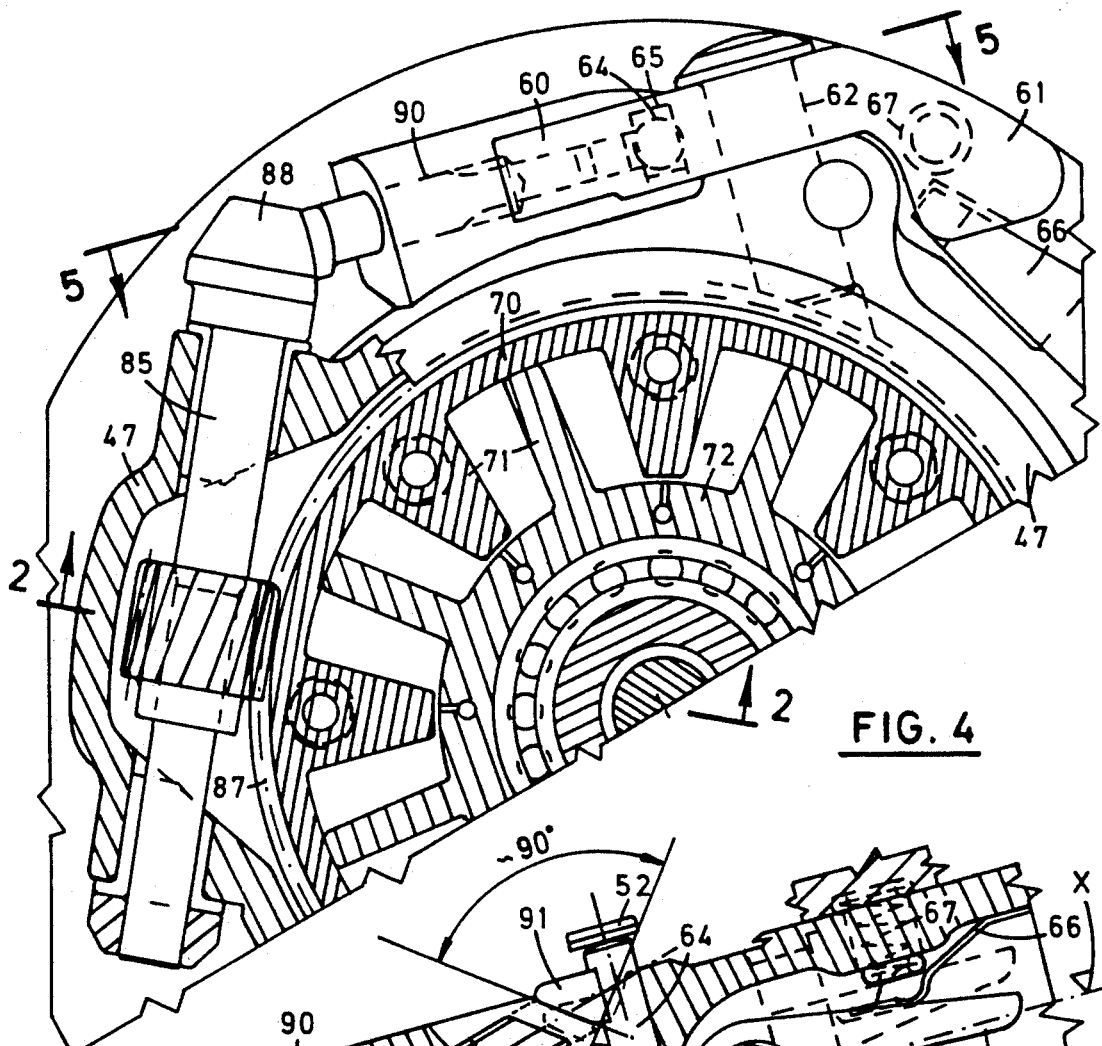
FIG. 4 is a cross-sectional view taken across line 4—4 of FIG. 1.

The sun wheel 87, and small helical gear wheels 86, require additional lubrication. The additional lubrication is accomplished by oil jet-streams 98 directed onto the teeth of the sun wheel 87 just in front of the small helical gear-wheels 86, FIG. 2. The jet-streams are brought about by nozzles 97, arranged between the spring tongues 41, 52 of the star plate spring 51, FIG. 3. The nozzles are fitted to cantilevers of the annular piston 50 of the friction clutch-part, and are supplied with oil from the engine through radial bores 96 and bores 95 in the clutch-housing 45.

I claim:

1. A self-synchronizing 720° clutch for partial crankshafts of split environmental engines comprising:

a friction clutch part and an axially latching ratchet mechanism part, connected in parallel so that torque can be transferred by one or the other as well as by both clutch parts together, the friction clutch part having a reduced torque transferring capacity resulting in a slowly sliding movement of the friction clutch part when the torque of the firing secondary engine is applied, the ratchet mechanism part having a characteristic grip direction being opposite to that of the relative rotation direction between the partial crankshafts of the primary and secondary engines during starting and cranking operations of the secondary engine, a ratchet wheel of the ratchet mechanism having only one pawl gap for each pawl; and control gear means for controlling the ratchet mechanism part clutch so that it synchronizes and clutches together the partial crankshafts at intervals of two complete relative revolutions between the partial crankshafts or a multiple thereof, whereby the synchronization coincides with the synchronization point between the partial crankshafts of the primary and secondary engines.

2. The self-synchronizing 720° clutch according to claim 1, wherein the control gear means further comprise:

a helical gear central sun wheel arranged coaxially with the clutch and attached to the outside of the housing of a hydrostatic vibration damper;

a smaller helical gear wheel accommodated in a bight of the clutch housing cover, positioned tangentially to and driven by the sun wheel, having a rotation step down ratio between the sun wheel and the smaller helical gear wheel of 1:2;

an auxiliary shaft coaxially connected to the smaller helical gear wheel and extending in a direction tangential to the sun wheel through the bight of the clutch housing cover such that the auxiliary shaft and smaller helical gear rotate collectively when driven by the sun wheel;

a conical cam connected to the end of the auxiliary shaft outside of the clutch housing cover having a circumference which is half circular and half elliptical;

a pawl mounted outside of the clutch housing cover in a substantially radial disposition to the rotation axis of the clutch;

a pawl gap in the ratchet wheel of the ratchet mechanism for receiving the pawl;

a tappet slidably mounted in a bore in a protruding rim section of the clutch housing cover with its longitudinal axis lying in a tangential plane in relation to the sun wheel with an inclination angle in relation to the radial plane of the clutch housing, having its first end extending out of the protruding rim portion of the clutch housing cover and in contact with the conical cam so that the circumference of the conical cam pushes on the tappet; and a push-pin mounted in the protruding rim section of the clutch housing cover for engaging the pawl into its pawl gap, and having a nose which abuts the second end of the tappet, whereby the tappet pushes on the nose and restrains the engagement of the pawl from latching into its gap when the circular portion of the circumference of the conical cam pushes on the tappet, and the tappet releases from the nose allowing the pawl to latch into its pawl gap when the elliptical portion of the circumference of the conical cam pushes on the tappet, so that the pawl only engages into its pawl gap once during each revolution of the conical cam which corresponds to two relative revolutions between the partial crankshafts.

3. The self-synchronizing clutch according to claim 2, wherein the abutting faces of the tappet and the push-pin nose are oppositely inclined and parallel, and being characterized by a substantially right angled arrangement in relation to the bisectional line of the angle between the longitudinal axes of the tappet and of the push-pin so that the tappet can push against the push-pin nose and move the push-pin backwards to unlatch the pawl from its pawl gap.

4. The clutch according to claim 3, wherein a plurality of the smaller helical gear wheels, auxiliary shafts, conical cams, individual pawls and corresponding pawl gaps, push-pins and noses, and tappets are collectively mounted in the periphery of the sun wheel, and wherein the pawls are latched into corresponding pawl gaps at equal intervals.

5. The self-synchronizing clutch according to claim 4, further comprising means for lubricating the sun wheel and smaller helical gear wheels.

6. The self-synchronizing clutch according to claim 5, wherein the lubrication means comprise:

nozzles arranged between spring tongues of a star plate spring of the friction clutch part, and fitted to cantilevers connected to bores in an annular piston of the friction clutch part and further connected to bores in the clutch housing.

* * * * *